(12) United States Patent
King

(10) Patent No.: US 6,346,911 B1
(45) Date of Patent: Feb. 12, 2002

(54) METHOD AND APPARATUS FOR DETERMINING TIME IN A GPS RECEIVER

(75) Inventor: Thomas M. King, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/539,137

(22) Filed: Mar. 30, 2000

(51) Int. Cl.[7] .............................................. H04B 7/185
(52) U.S. Cl. .......................... 342/357.06; 342/357.12; 342/357.13
(58) Field of Search ....................... 342/357.06, 357.12, 342/357.13; 701/213; 455/12.1

(56) References Cited

U.S. PATENT DOCUMENTS

| | | |
|---|---|---|
| 5,225,842 A | 7/1993 | Brown et al. |
| 5,319,374 A | 6/1994 | Desai et al. |
| 5,663,735 A | 9/1997 | Eshenbach |
| 5,736,960 A | 4/1998 | Murphy et al. |
| 5,752,218 A * | 5/1998 | Harrison et al. ............ 701/207 |
| 5,812,087 A | 9/1998 | Krasner |
| 5,917,444 A * | 6/1999 | Loomis et al. .............. 342/357 |
| 5,945,944 A | 8/1999 | Krasner |
| 6,151,353 A * | 11/2000 | Harrison et al. ............ 375/136 |

OTHER PUBLICATIONS

Scott Bloebaum, *Alternatives for GPS Timing and Sensitivity Assistance*, T1P1.5/2000–032r0, Jan. 24, 2000.

* cited by examiner

*Primary Examiner*—Dao Phan
(74) *Attorney, Agent, or Firm*—Sylvia Y. Chen; Roland K. Bowler, II

(57) ABSTRACT

A method and apparatus for determining time in a GPS receiver is provided according to the invention. The method includes the steps of capturing (304) GPS data in a GPS message for a predetermined period of time, locating (308) a predetermined data sequence in the captured data, and determining (311) a time offset between a data capture start time and a time of arrival of the expected data pattern.

68 Claims, 7 Drawing Sheets

METHOD AND APPARATUS FOR DETERMINING TIME IN A GPS RECEIVER

CROSS-REFERENCE TO RELATED APPLICATIONS

The present application claims priority from, and the benefit of the filing date of, pending U.S. patent application Ser. No. 09/253,318, filed Feb. 19, 1999, from pending U.S. patent application Ser. No. 09/253,662, filed Feb. 19, 1999, and from pending U.S. patent application Ser. No. 09/253,679, filed Feb. 19, 1999.

BACKGROUND OF THE INVENTION

1. Field of the Invention

The present invention relates generally to a GPS receiver, and more particularly to a GPS handset.

2. Description of the Background Art

The Global Positioning System (GPS) is a satellite-based system developed by the U.S. Department of Defense to give accurate positional information to a GPS receiver anywhere in the world. A properly equipped GPS receiver may therefore be used in any setting in which position is desired, and typically yields positional coordinates in three dimensions. The GPS system is enabled by a satellite orbital constellation made up of 24 or more satellites orbiting the earth in 12 hour orbits. The satellites are arranged in six orbital planes, each containing four satellites. The orbital planes are spaced sixty degrees apart, and are inclined approximately fifty-five degrees from the equatorial plane. This constellation ensures that from four to twelve satellites will be visible at any time at any point on earth with a clear view of the sky.

The GPS satellites transmit data to be used by GPS receivers, including satellite position data (ephemeris data) and satellite clock correction data. The GPS signal includes a carrier signal that is bi-phase modulated with a 1023 bit long Gold spreading code at a 1.023 Mhz chip rate (0.001 second repeat interval). It is also modulated by data bits at a 50 bits per second (BPS) rate (transmitted at a rate of twenty milliseconds per data bit). The 50 BPS data includes information for determining a GPS-based time (i.e., a clock time of the GPS satellite) and information for determining geographical location.

Detailed information on the data contained within the GPS signal is available in Interface Control Document ICD-GPS-200, revised in 1991, published by Rockwell International Corporation and incorporated herein by reference.

The clock time included in the GPS message is an absolute time signal that is precisely synchronized at the satellite. That is, all satellites in the GPS constellation are synchronized by ground reference stations that take into account the signal propagation time from the satellite to the ground station. In this manner, every satellite in the constellation is time synchronized at the satellite, the absolute time error is precisely controlled to within a few nanoseconds to tens of nanoseconds.

The absolute time signal may be used by a GPS receiver in order to accurately determine position. Once position is approximately known, the absolute time in the receiver can also be known by offsetting the precise time observed by the receiver in the satellite broadcast message by the computable propagation delay between the receiver and the satellite.

Knowledge of absolute time in the receiver is an important parameter because the GPS satellites move at approximately four meters per millisecond. If the range measurement time is in error by one millisecond, then the measured ranges can be in error by as much as four meters. This range error then multiplies by a geometry factor (GDOP, or Geometric Dilution Of Precision) to translate into additional positional error that can be many times the four meters of additional range error.

A Time Of Week (TOW) data field included in the 50 BPS data, in conjunction with the absolute time signal, allows a GPS receiver to accurately and reliably determine a local time. The TOW data is transmitted by all satellites at six second intervals. The detection of the TOW data is dependent on the signal magnitude. Below a certain signal magnitude level it is possible to obtain a range measurement, but it is not possible to decode the TOW data. For example, for signal levels below approximately 30 dB-Hz, it becomes impossible to decode individual message bits of the 50 BPS message. It is possible, however, to obtain signal correlation at signals substantially below 30 dB-Hz, down to levels below 20 dB-Hz. Techniques employed by Motorola applications Ser. Nos. 09/253,318, 09/253,662, and 09/253,679 can be used to extend the sensitivity of correlation detection to these levels. Thus, what is needed is a method of determining time at signal levels below 30 dB-Hz.

The GPS receiver cannot always reliably determine a local time from the GPS satellite broadcast data. GPS functions are very useful and as a result have been incorporated into a variety of devices, including, for example, cellular phones, and other hand-held electronic devices. Due to their portable nature, such devices are often in vehicles traveling in urban canyons, or carried into buildings or other obstacles. As a natural result, the GPS signal may be blocked or poorly received. This may make the reception of the 50 BPS absolute time signal unreliable. In such cases, it is desirable that a GPS handset obtain an accurate time measurement so that positional measurements are available. Because GPS satellites move at a rate of approximately 4 meters per millisecond, if a time of a range measurement is not known with accuracy, the range measurement and therefore the resulting positional measurement will have a proportional error. For example, if the measurement time contains an error of 20 milliseconds, the range measurement may be in error by as much as 80 meters, and the resulting position measurement may be in error by several hundreds of meters depending on the geometry.

In some cellular telephone devices, such as CDMA (code division multiple access) cellular phones, the infrastructure is synchronized and every base station receives a precise time from a network GPS receiver. The CDMA base station then synchronizes mobile devices by transmitting the time to the mobile devices, allowing a time in the CDMA phone handset to be known to an accuracy on the order of one microsecond (plus a transmission delay).

In non-synchronized GPS devices, such as, for example, Global System for Mobile communications (GSM) cellular phones, precise time information is desirable but generally not available from the signals emanating from the network. However, it is impractical and expensive to modify existing networks in order to synchronize them by adding appropriate hardware and/or software.

The related art has attempted to solve the problem in a variety of ways. A first scheme is given in Krasner, U.S. Pat. No. 5,812,087. Krasner uses a digital snapshot memory in a handset to capture a random swath of data and transmit it to a base station. The base station uses a conventional GPS receiver to measure the time of arrival of a portion of the 50

BPS data bits captured in the digital snapshot memory. The data bits measured by the base station have a known time of arrival and are correlated against the unknown data bits captured in the digital snapshot memory. When a maximum correlation is obtained, the data capture time in the mobile memory can be determined.

However, the drawback in Krasner is that a remote base station GPS receiver is required. The remote base station GPS receiver must measure a current 50 GPS data sequence from one or multiple GPS satellites and then transmit it to the mobile unit. Alternatively, the mobile unit may transmit post-detection correlation data to the base. In either manner, the scheme requires that a large number of bits be transmitted between the base station and the mobile unit (for example, 12 satellites time 50 bits each), and it requires that the handset store a sample of the received data for subsequent correlation with the pattern observed and communicated from the base station.

In a second related art scheme, Location Measurement Units (LMUs) are placed throughout an unsynchronized network. The purpose of the LMU is to measure the time offset between a time as kept by an unsynchronized communication network and GPS time. An individual LMU measures the time of arrival of message bits from each base station and determines the relative time offset of each base station. This is accomplished by a GPS receiver inside an LMU, and with knowledge of the location of each base station and the location of the LMU (for purposes of determining a propagation time).

The second related art scheme, however, is costly because it requires additional components in a communication network. It is also a complicated solution.

In a third related art scheme, the 50 BPS data sequence is observed at a fixed master site. The time data is transmitted from the master site to a mobile unit. The mobile unit may use the known data pattern and its known time of arrival (observed by the master site) to narrow the acquisition bandwidth below the 50 BPS data rate.

Again, a major drawback is that the measured 50 BPS data sequence must be transmitted to the mobile unit, and the mobile unit must be able to receive and demodulate the data.

There remains a need in the art, therefore, for a time-of-measurement determination in a GPS handset that is part of a non-synchronized network, such as the GSM system.

SUMMARY OF THE INVENTION

A method for determining time in a GPS receiver is provided according to a first aspect of the invention. The method comprises the steps of capturing GPS data from a GPS message for a predetermined period of time, locating a expected data pattern in the captured data, and determining a time offset between a data capture start time and a time of arrival of the expected data pattern.

A method for determining time in a GPS receiver is provided according to a second aspect of the invention. The method comprises the steps of capturing post-correlation coherent GPS data for a predetermined period of time, locating a expected data pattern in the captured data, and determining a time offset between a data capture start time and a time of arrival of the expected data pattern.

A method for determining time in a GPS receiver is provided according to a third aspect of the invention. The method comprises the steps of down converting the GPS message to a predetermined intermediate frequency, sampling the intermediate frequency to produce a plurality of samples, storing the plurality of samples into a memory, determining a code phase for each visible GPS satellite signal, determining a Doppler shift for each visible GPS satellite signal in the memory, selecting a satellite GPS data, measuring and storing an in-phase coherent characteristic of a post correlation data over a plurality of predetermined time periods, measuring and storing a quadrature coherent characteristic of a post correlation data over a plurality of predetermined time periods, coherently correlating the in-phase and the quadrature characteristics to a expected data pattern, and determining a time offset from a correlation maximum, with the correlation maximum occurring the time offset after a beginning of the capturing step.

A method for determining time in a GPS receiver is provided according to a fourth aspect of the invention. The method comprises the steps of down converting the GPS message to a predetermined intermediate frequency, sampling the intermediate frequency to produce a plurality of samples, non-coherently correlating the plurality of samples against each visible satellite PRN and each visible satellite Doppler, determining a real-time code phase and a real-time Doppler shift for each visible GPS satellite signal, selecting satellite GPS data, measuring and storing a real-time in-phase coherent characteristic of post-correlation data over a plurality of predetermined time periods, measuring and storing a real-time quadrature coherent characteristic of post correlation data over a plurality of predetermined time periods, coherently correlating the in-phase and the quadrature characteristics to a expected data pattern, and determining a time offset from a correlation maximum, with the correlation maximum occurring the time offset after a beginning of the non-coherent correlating step.

An apparatus for determining time in a GPS receiver is provided according to a fifth aspect of the invention. The apparatus comprises a GPS down converter for down converting a GPS signal to an intermediate frequency, the down converting capable of being connected to a GPS signal source, an analog-to-digital converter connected to the down converter for converting intermediate frequency data to digital data, a digital IF switch connected to the analog-to-digital converter and connected to a clock, the digital IF switch is controlled by the clock to periodically close for a predetermined sample time period, an IF memory connected to the digital IF switch and capable of storing a plurality of digital IF data available when the digital IF switch is closed, a non-coherent GPS correlator connected to the IF memory and capable of determining a code phase characteristic, determining a Doppler characteristic, and determining a signal strength characteristic for the plurality of digital IF data, a coherent GPS correlator connected to both the IF memory and the non-coherent GPS correlator and producing in-phase and quadrature coherent measurements, a memory storage switch connected to the coherent GPS correlator, the memory storage switch periodically closing to produce a plurality of in-phase and quadrature measurements, a samples memory connected to the memory storage switch and capable of storing the plurality of in-phase and quadrature measurements, a correlator connected to the samples memory and to a expected data pattern storage, the correlator coherently correlating the plurality of in-phase and quadrature measurements to a expected data pattern to produce a correlation output, a coherent integrator connected to the correlator, the coherent integrator integrating the correlation output to produce an integration output, a magnitude determiner connected to the coherent integrator, the magnitude determiner detecting a magnitude of the integration output and generating a plurality of integration magnitudes, a magnitude versus delay memory connected to the magnitude determiner and storing the plurality of integration magnitudes, and a maximum integration magnitude determiner connected to the magnitude versus delay memory and capable of determining a maximum integration magnitude, wherein a delay period of a maximum signal magnitude is a time offset.

An apparatus for determining time in a GPS receiver is provided according to a sixth aspect of the invention. The apparatus comprises a GPS down converter for down converting a GPS signal to an intermediate frequency, the down converting capable of being connected to a GPS signal source, an analog-to-digital converter connected to the down converter for converting intermediate frequency data to a plurality of digital data, a non-coherent GPS correlator connected to the analog-to-digital converter and capable of determining a code phase characteristic, determining a Doppler characteristic, and determining a signal strength characteristic for the plurality of digital data, a coherent GPS correlator connected to both the analog-to-digital converter and the non-coherent GPS correlator and producing in-phase and quadrature coherent measurements, a memory storage switch connected to the coherent GPS correlator, the memory storage switch periodically closing to produce a plurality of in-phase and quadrature measurements, a samples memory connected to the memory storage switch and capable of storing the plurality of in-phase and quadrature post-correlation measurements, a correlator connected to the samples memory and to a expected data pattern storage, the correlator coherently correlating the plurality of in-phase and quadrature measurements to a expected data pattern to produce a correlation output, a coherent integrator connected to the correlator, the coherent integrator integrating the correlation output to produce an integration output, a magnitude determiner connected to the coherent integrator, the magnitude determiner detecting a magnitude of the integration output and generating a plurality of integration magnitudes, a magnitude versus delay memory connected to the magnitude determiner and storing the plurality of integration magnitudes, and a maximum integration magnitude determiner connected to the magnitude versus delay memory and capable of determining a maximum integration magnitude, wherein a delay period of a maximum signal magnitude is a time offset.

The above and other features and advantages of the present invention will be further understood from the following description of the preferred embodiments thereof, taken in conjunction with the accompanying drawings.

DETAILED DESCRIPTION OF THE PREFERRED EMBODIMENTS

A low cost method of determining time in a non-synchronized GPS handset is done without the need for communications links and data transfer with external receivers or independent timing devices. The predictable structure of the GPS satellite signal provides assistance in determining time at the handset.

There are at least three segments of the satellite broadcast data (each of which repeat every 6 seconds) in which the 50 BPS data pattern or data sequence is precisely known or is precisely computable as a function of time (i.e., deterministic). These known and predictable data sequences or data patterns can be correlated across multiple data bits and used to determine the precise time, even when the GPS signal is too weak to allow demodulation of the individual bits of the 50 BPS data message.

Figure 1:
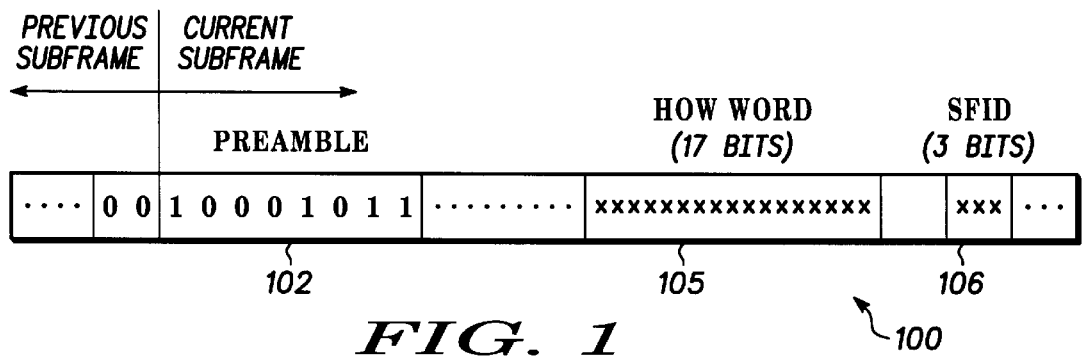
FIG. 1 shows a GPS data word.

FIG. 1 shows the GPS data word 100 that is transmitted every 6 seconds by every GPS satellite. The GPS data word 100 includes a preamble 102, a HOW word 105, and a subframe ID 106. The preamble 102 contains a predetermined eight bit identifier that is the same for every satellite, with the same pattern repeating every six seconds. In addition, the preceding two bits from the previous subframe are always the same (00), thus a total of ten bits are always the same for every satellite. In the remainder of this document, the term "preamble" is meant to include the ten-bit sequence with the preceding subframe's last two bits (00) and the eight-bit sequence at the start of the current subframe. The preamble 102 takes 200 milliseconds to be transmitted by each satellite based on the 50 BPS data rate. The HOW word 105 is a seventeen-bit long word that defines the time of week of the first bit of the next subframe. The subframe ID 106 is a three-bit field that defines the contents of each of the five possible subframes. The HOW word 105 takes 340 milliseconds to transmit, and the subframe ID 106 takes 60 milliseconds to transmit.

As a result, the ten-bit preamble 102 is always the same and known, and the seventeen-bit HOW word 105 and the three-bit subframe ID 106 are predictable as a function of time. Since a new HOW word 105 and subframe ID 106 appear in a message at six second intervals, knowledge of local time to within three seconds in the handset allows knowledge of the precise pattern of the seventeen-bit HOW word 105 and three-bit subframe ID 106 for every subframe. Maintaining handset local time to within three seconds is easily within the capabilities of low cost and low power real-time clocks that are already part of every digital handset.

Every bit of the 50 BPS message is coherent with the 1023 bit spreading Gold code that is transmitted at 1.023 MHz, which itself is also coherent relative to the precise satellite clock. The Gold code repeats twenty times for every data bit, requiring a time period of about twenty milliseconds to decode the twenty occurrences of each Gold code bit.

Since the entire 50 BPS message is synchronous with the satellite clock, the time of transmission from the satellite of each bit of the 50 BPS message is precisely controlled and known, and can be used to indicate precise time. As mentioned earlier, the GPS ground control segment maintains (i.e., steers) the precise clock in each satellite to an accuracy of a few nanoseconds. As a result, the time of transmission from the satellite of the preamble 102, the HOW word 105, and the subframe ID 106 is precisely known. Synchronizing to the time of reception of these known or predictable data bit patterns allows transfer of precise absolute local time from the GPS satellite to the GPS receiver by adding the time of flight of the signal (the propagation delay between the satellite and receiver) and the satellite clock error to the time of reception of the predicted bits. The propagation delay and the satellite clock errors are computable in the receiver by knowledge of the satellite broadcast ephemeris and clock correction data, which are also needed to compute position from the range measurements.

The arrival time of the GPS data word 100 may be used to calibrate a free-running local clock within the GPS handset. The calibration method is taught by U.S. Pat. No. 5,893,044 to King, incorporated herein by reference. The Time Of Arrival (TOA) of the preamble 102, and/or the HOW word 105, and/or the subframe ID 106 may be used to measure the measurement time of the satellite ranges on the fly, or optionally, may be used to measure the capture time into a memory. The on-the-fly method of GPS signal capture and correlation may be used in instances where the GPS signal is strong and the memory method of GPS signal capture and correlation may be used when the signal is weak or unreliable.

If a memory is used, the memory is preferably larger than necessary to contain any one or all data segments. The time of capture is preferably controlled by a free-running local real-time clock that is periodically recalibrated by the technique of the present invention, or by the technique taught by U.S. Pat. No. 5,893,044 to King, or by the use of some other coarse time reference such as a pulse or message sent from the network to the handset. The important thing is that the capture interval start time is of sufficient accuracy to be able to discriminate the start of one subframe data pattern from the other, or at most 3 seconds error. Once a data segment is captured into memory (either IF memory for pre-correlation, or post correlation memory), the precise time of arrival of the data segment may be directly measured, thus establishing the time of data capture, and thus the range measurement time. This may be done without the need to modify extensively the hardware of existing GSM cellular devices, without the need to add additional components to an existing communications network, or without the need for special network messaging.

The GPS receiver or handset may have its own internal clock. However, this internal clock may not have a necessary accuracy in order to accurately track the time of arrival of GPS signal data. Instead, the internal clock can be periodically recalibrated by extracting the time of arrival of the GPS data message 100 and using the measured time of arrival to periodically recalibrate the internal clock. It is anticipated that in a worst case a local real-time clock in the GPS handset may use a 32 kHz oscillator having an error of about 50 parts per million (PPM), necessitating recalibration approximately twice a day (a 1 second accuracy drift).

Of course, as the local real-time clock in the handset varies, the measured time of arrival of the GPS data message 100 will vary, but due to the relatively small variation in the local real-time clock (for which its time rate of change can also be calibrated by GPS), the measured time of arrival may be used to determine an offset that is useful for recalibrating the local real-time clock. For example, in FIG. 1 the vertical line showing the previous subframe and the current subframe may indicate where the GPS handset expects the GPS data message 100 to start. Therefore, measuring the difference between the actual start and when the GPS handset expects it to start gives a time offset that may be used to recalibrate the GPS handset clock time and rate of change of time.

For the case in which the local real-time clock has not been calibrated, then a search process is used to sample a segment, examine it for the known data pattern or sequence, and then slide the examination interval to another segment length and repeat until the desired known data pattern or sequence is found.

Figure 2A:
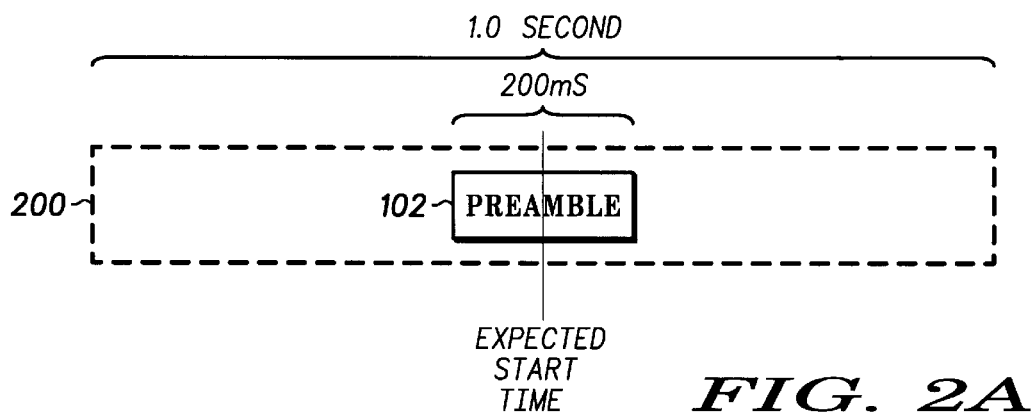
FIGS. 2A–2B show the use of a one second capture timeframe used to capture a data segment of the GPS data word.
Figure 2B:
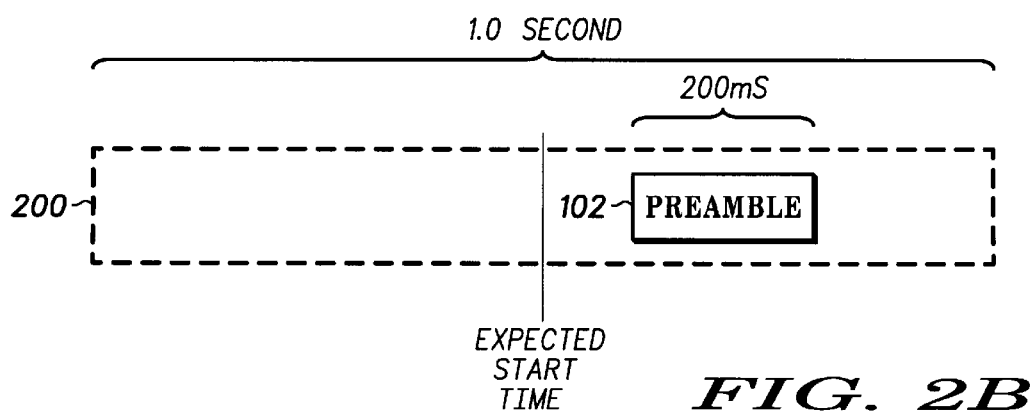

FIGS. 2A–2B show the use of a one-second capture timeframe 200 to capture a data segment. An incoming GPS signal is captured for a period of one second in this embodiment. Other capture timeframes may be used as desired. In FIG. 2A the preamble 102 arrives before the expected start time of the GPS handset (due to clock drift). However, due to the size of the capture timeframe 200, the entire preamble 102 is captured and stored. A one-second capture timeframe is preferred so that GPS data before and after the expected start time of the preamble is captured. Therefore, captured data can be examined to find exactly when the preamble starts.

In FIG. 2B the preamble 102 arrives after the expected start time. By using a one second capture timeframe 200 the local handset clock may be off quite a bit and yet the full preamble 102 may still be captured.

Figure 3:
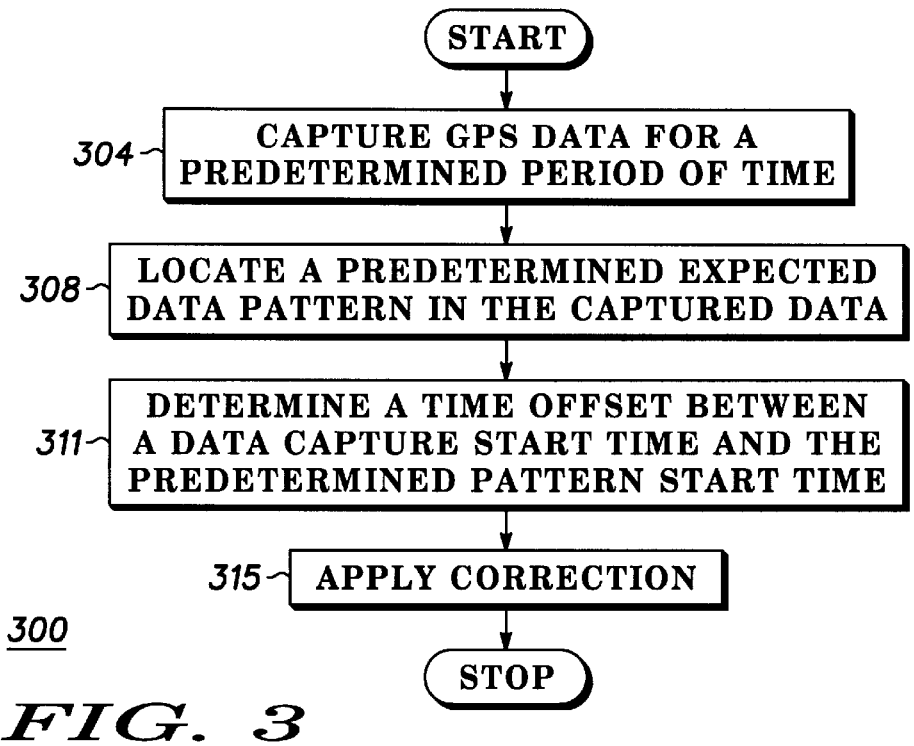
FIG. 3 shows a flow chart of a first embodiment of the method of the present invention.

FIG. 3 shows a flow chart 300 of a first embodiment of the method for determining time in a GPS handset. In step 304 GPS data is captured for a predetermined period of time. In the preferred embodiment, GPS data is captured for about one second as shown in FIG. 2A and FIG. 2B, although other time periods can be used. The start time and duration of the capture event are controlled by a local real-time clock. The local real-time clock has been previously calibrated (either by the method described herein or by traditional GPS signal processing techniques), and may drift.

The accuracy of the local real-time clock is dependent on the stability of a driving oscillator, such as, for example, a handset reference oscillator. In GSM and CDMA handsets the handset reference oscillator typically has a stability of about 0.05 PPM (i.e., the oscillator may vary by about plus or minus 5 oscillations for every 100,000,000 oscillations). The local real-time clock may also be driven by a simple 32 KHz free-running oscillator.

In step 308, a expected data pattern with deterministic or predetermined characteristics (e.g., a code replica of a preamble, HOW word, subframe ID, etc.) is located in the captured data. In the preferred embodiment, this is the preamble 102 shown in FIG. 1. However, other expected data patterns with deterministic or predetermined characteristics may be used, such as the HOW word 105.

In step 311 a time offset from the beginning of the capture to the time of arrival of the expected data pattern or data sequence is determined.

In step 315 the propagation delay of the signal from the satellite and receiver and the satellite offset clock correction is applied, creating a precise measure of the local time. This time offset may be used to recalibrate the clock in the GPS handset, as well as becoming the basis for time stamping the satellite range measurements.

Figure 4:
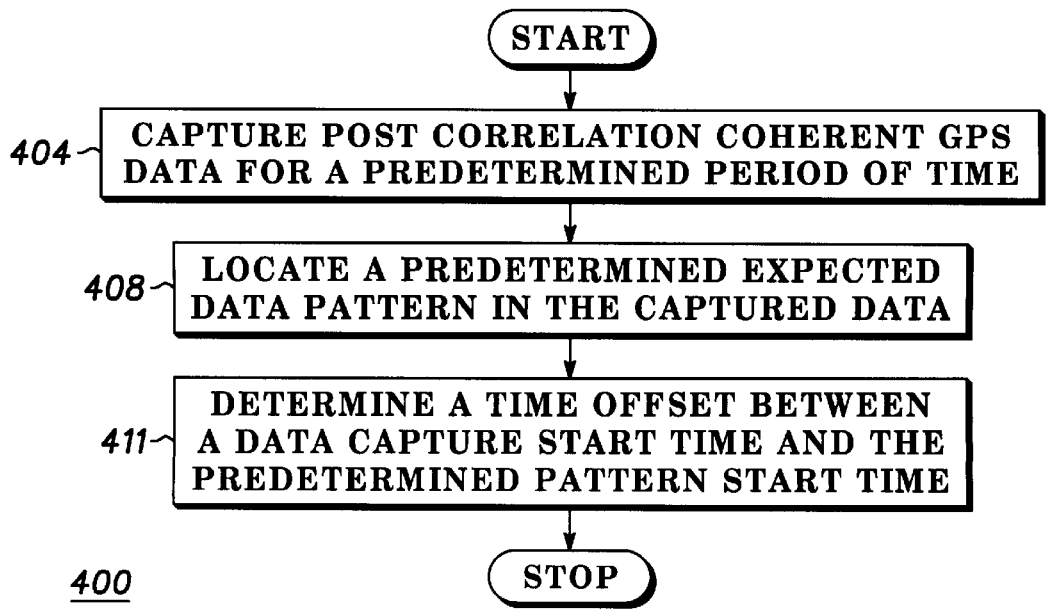
FIG. 4 shows a flow chart of a second embodiment of the method of the present invention.

FIG. 4 shows a flowchart 400 of a second embodiment of the method for determining time in a GPS handset. The flow chart 400 differs from the flow chart 300 of the first embodiment only in that the method is performed on the fly. Therefore, in step 404, instead of just capturing GPS data as in step 304, the method captures post correlation coherent GPS data. Step 408 is equivalent to step 308; step 411 is equivalent to step 311.

It should be understood that either the flow chart 300 or the flow chart 400 may be used. The real-time, on-the-fly method is preferred, but alternatively a GPS signal may be stored in memory and then processed. The memory is generally used in cases where the receiver has lost a correlation lock and can no longer correlate the signal in real-time, as it is received. This may be done in order to improve or maintain signal reception, to improve the strength of the received signal, to reduce power consumption, or to spread the computational load out over time.

Figure 5:
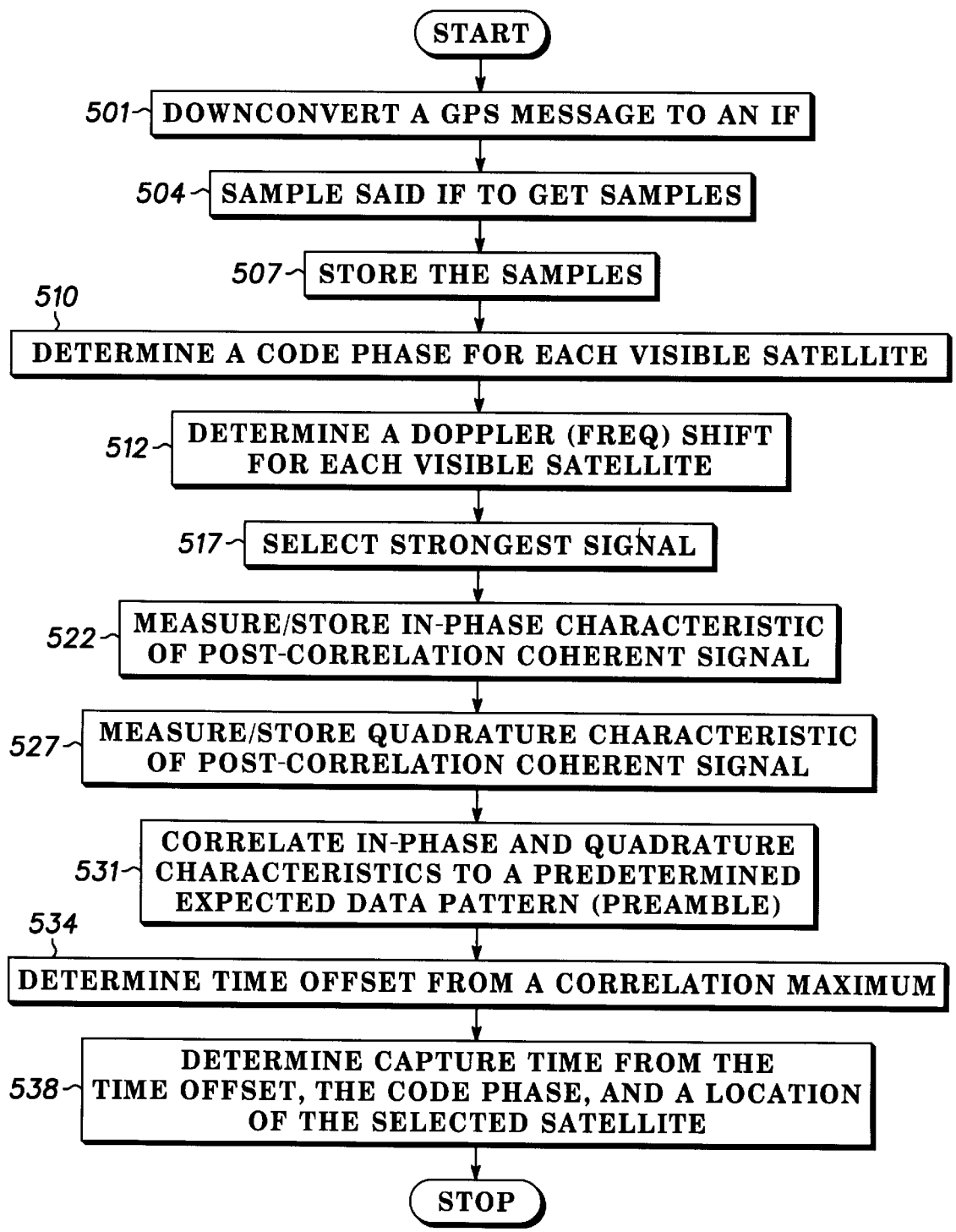
FIG. 5 shows a flow chart of a third embodiment of the method of the present invention.

FIG. 5 shows a flow chart 500 of a third embodiment of the method for determining time in a GPS handset. In step 501, a received GPS message is down converted to an intermediate frequency. This is commonly known in the art and is done to make data processing and handling easier.

In step 504, the intermediate frequency is sampled to get a plurality of digital samples. The sampling is usually done over a predetermined time period such as, for example, one second, and as a result in the preferred embodiment two-hundred samples are created.

In step 507, the digital IF samples are stored. In the preferred embodiment, they are stored in a general memory such as, for example, a random access memory. However, the digital IF samples may be stored in any type of digital storage device.

In step 510, a code phase is determined for each visible satellite for which data has been received.

In step 512, a Doppler (or frequency) shift is determined for data that is received for each visible satellite. The GPS system employs twenty-four satellites distributed in orbit around the earth and generally at least four satellites are visible from any point on earth with a clear view of the sky.

In step 517, the strongest signal is chosen for processing. Because the method is designed to determine an accurate time during periods when reception of GPS signals is relatively poor, selection of the strongest signal gives the most reliability and the most probability of success. It also reduces the computational time and its resulting power consumption by only processing the minimum number of signals needed for time determination, that being one satellite signal. Of course, the strongest signal is not absolutely necessary for determining accurate time. Additionally (but sub-optimally), multiple signals could be processed to determine time in the receiver.

In step 522, an in-phase characteristic of the post-correlation coherent signal is measured and stored. In step 527, a quadrature characteristic of the post-correlation coherent signal is measured and stored. Steps 522 and 527 are preferably performed simultaneously.

In step 531, the in-phase and quadrature characteristics determined in steps 522 and 527 are coherently correlated to an expected data pattern. In a preferred embodiment, this is the preamble 102, the HOW word 105, and/or the subframe ID 106. In effect, step 531 is comparing in-phase and quadrature characteristics of the received signal to the expected data pattern to determine when the expected data pattern starts in the sequence of received data.

In step 534, a time offset is determined from the correlation maximum. The correlation of step 531 will produce a peak (which can be seen in FIG. 9), and this peak is the point of maximum correlation, i.e., the point at which the incoming data matches the expected data pattern. The time between the start of data capture and the peak, therefore, gives the time offset at which the start of the expected data pattern occurs.

In step 538, the capture time is determined from the time offset determined in step 534, the code phase and location of the selected satellite, the clock correction corresponding to the satellite (standard in any GPS receiver), the known time of arrival of the particular GPS data segment (preamble 102, HOW word 105, and/or subframe ID 106), and the geographical location of the handset. The location of the handset may be computed by iteration from an initial guess, with the initial guess being for example the location of the closest cellular base station (each cellular base station has a known latitude and longitude). This data is sufficient to determine the time offset. The time offset can then be used to recalibrate the handset real-time clock to maintain time synchronicity with the GPS satellite system.

Figure 6:
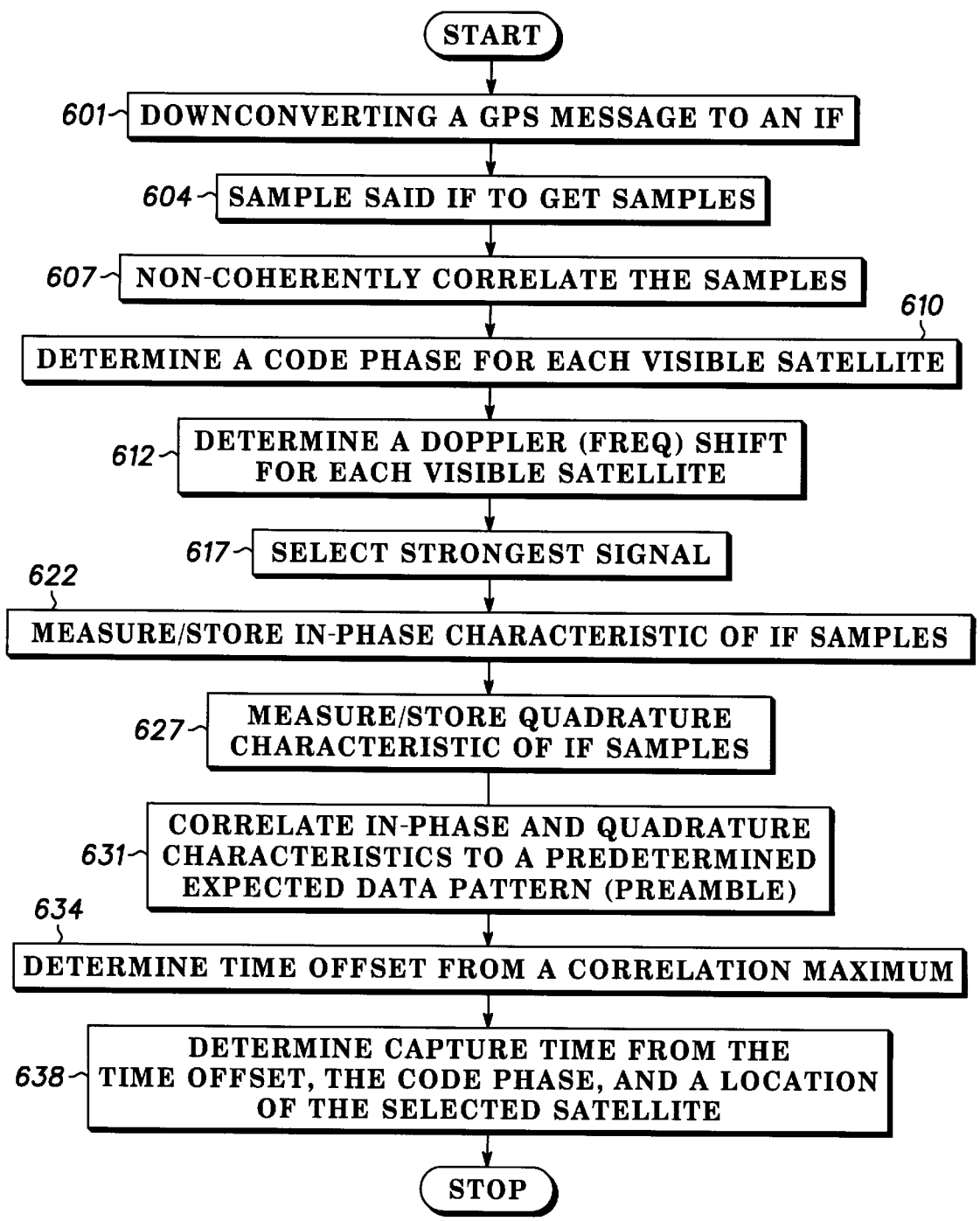
FIG. 6 shows a flow chart of a fourth embodiment of the method of the present invention.

FIG. 6 shows a flowchart 600 of a fourth embodiment of the method for determining time in a GPS handset. The flow chart 600 differs from the flow chart 500 of the third embodiment in that for step 607, the flow chart 600 non-coherently correlates GPS samples against each visible satellite Pseudo Random Noise (PRN) code (i.e., a unique identifier for each satellite, also know as a Gold code) and each visible satellite Doppler characteristic. The other steps shown in FIG. 6 are analogous to their counterpart steps in FIG. 5. Similar to the method of FIG. 4, the method of FIG. 6 is an on-the-fly time offset determination, not requiring a digital IF memory.

It should be understood that either the flow chart 500 or the flow chart 600 may be used. The real-time, on-the-fly method is preferred, but alternatively a GPS signal may be stored in memory and then processed. The memory is generally used in cases where the receiver has lost a correlation lock and can no longer correlate the signal in real-time, as it is received. This may be done in order to improve or maintain signal reception, to improve the strength of the received signal, to reduce power consumption, or to stretch out the processing over time.

Figure 7:
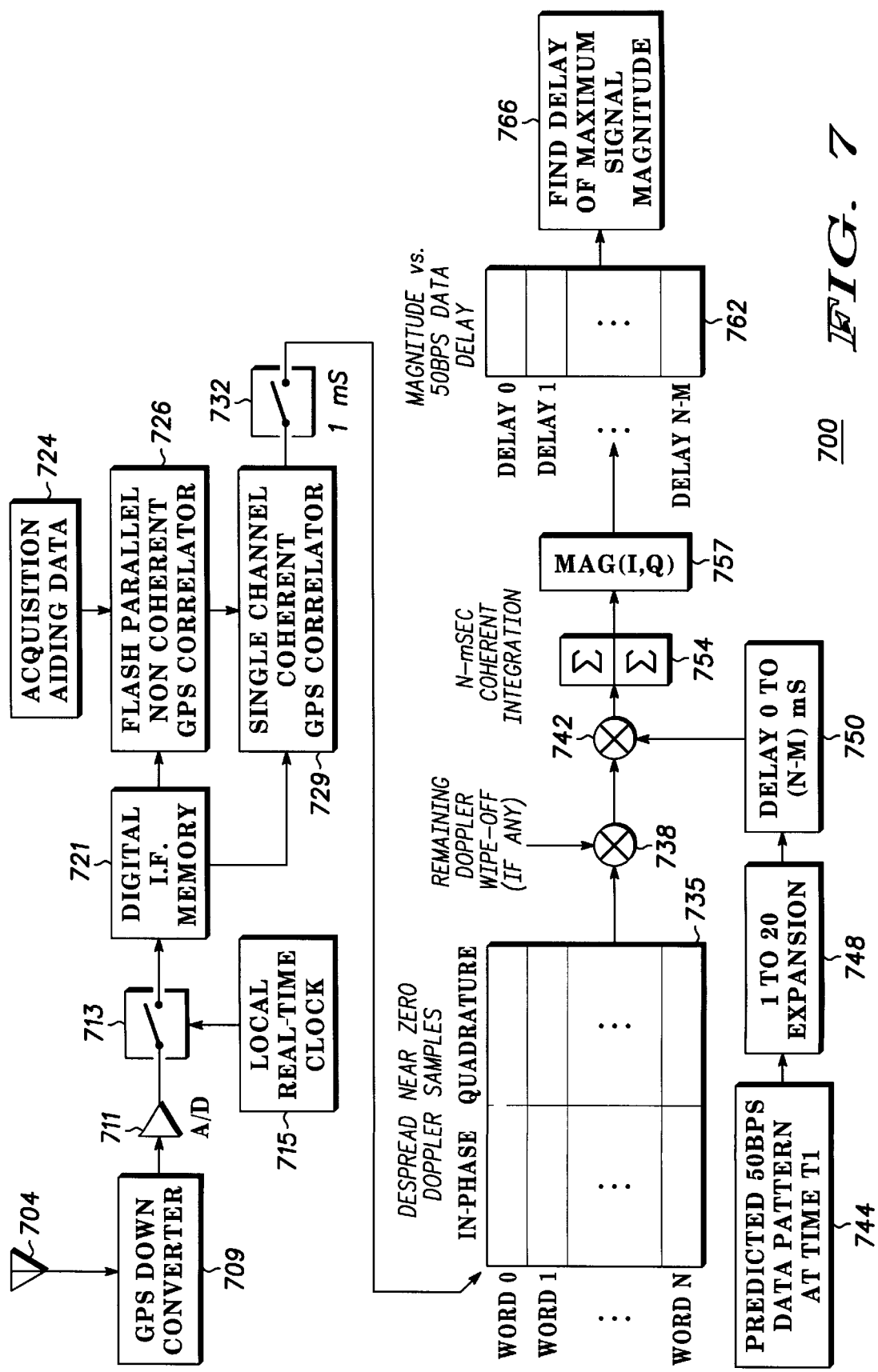
FIG. 7 shows a block diagram of a first embodiment of an apparatus for determining time in a GPS handset.

FIG. 7 shows a block diagram of a first embodiment of an apparatus 700 for determining time in a GPS handset. The apparatus 700 includes an antenna 704, a GPS down converter 709, an analog-to-digital converter (ADC) 711, a pre-correlation digital IF switch 713, a local real-time clock 715, a digital IF memory 721, acquisition aiding data 724, a non-coherent GPS correlator 726, a coherent GPS correlator 729, a post-correlation coherent memory storage switch 732, a samples memory 735, a clean-up mixer 738, a correlator 742, a pre-stored predicted expected data pattern 744, a time expander 748, a time delay 750, a coherent integrator 754, a magnitude determiner 757, a magnitude versus delay memory 762, and a maximum integration magnitude determiner 766.

The antenna 704 receives a GPS signal and passes it to the GPS down converter 709. The GPS down converter 709 converts the GPS data signal into an intermediate frequency (IF) and passes it to the ADC 711. The ADC 711 converts the IF data into digital IF data and sends the digital IF data to the digital IF switch 713. The digital IF switch 713, under control of the local real-time clock 715, takes periodic samples of the digital IF data, with the periodic samples (pre-correlation) being stored in the digital IF memory 721.

In order to guarantee that the target bits are properly captured in the N-millisecond long memory, the accuracy of the real-time clock 715 must be kept to within $(N-M)/2$ milliseconds. Given that in the preferred embodiment N is 1 second and M is 200 milliseconds, the clock can drift as much as about plus or minus 400 milliseconds and still be useful in capturing the target data sequence.

However, the local real-time clock 715 must be recalibrated periodically. The recalibration may be done through several methods, including: 1) applying the method described herein with each GPS position location request, 2) automatic recalibration when the real-time clock 715 is predicted to drift a predetermined unacceptable amount, 3) when the handset has a clear view of the sky and traditional GPS can extract time from the direct GPS signals, 4) obtaining time from a traditional GPS signal detector at times when the handset has remote power, such as when charging, and getting time directly from the GPS signal when it is available, 5) transfer time from a car-kit to the handset from an embedded GPS sensor built into the car-kit or from the vehicle itself via a wireless interface such as Bluetooth, for example, 6) transmit course time through the unsynchronized network.

The non-coherent GPS correlator 726 determines a code phase characteristic, a Doppler characteristic, and a signal strength of received GPS satellite signals stored in the digital IF memory 721. It should be understood that the hardware up to this point is capable of receiving multiple GPS satellite signals, with the digital IF data stored in the digital IF memory 721 containing data for several satellite signals. As previously stated, a minimum of four GPS satellites will be in view of the GPS handset at any time, and possibly more. Therefore, at least four GPS data signals may be present.

The non-coherent GPS correlator 726 also receives information from the acquisition aiding data 724, including satellite ephemeris, such as known and expected satellite locations. This acquisition aiding data 724 allows the non-coherent GPS correlator 726 to discriminate between satellite signals, and to determine the code phase (0 to 1 millisecond time offset) and Doppler frequency (+/−4 KHz) of each detectable satellite signal.

The non-coherent GPS correlator 726 may be a time domain correlator, where the correlator coherently sums successive outputs to 1 millisecond. An example of such a correlator is shown in U.S. Pat. No. 5,148,452 to Kennedy, et al., incorporated herein by reference. Alternatively, the non-coherent GPS correlator 726 may be a frequency domain correlator as disclosed by Krasner, U.S. Pat. No. 5,663,734 or as disclosed by Ma et al., U.S. Pat. No. 4,998,111, both of which are incorporated herein by reference. It is important to note that a non-coherent correlator does not require knowledge of the 50 BPS data pattern and can extract the code phase and Doppler shift of the signals in environments in which traditional GPS signal processing techniques fail. In addition, the non-coherent GPS correlator 726 may be implemented by dedicated hardware or may be created by software coded into a programmable digital signal processor.

The coherent GPS correlator 729 is likewise connected to the digital IF memory 721 and is also connected to the non-coherent GPS correlator 726. Data from the digital IF memory 721 is fed into the (single channel) coherent GPS correlator 729, and the coherent GPS correlator 729 makes one millisecond in-phase and quadrature measurements of the signal at the predetermined code phase and Doppler. The coherent GPS correlator 729 is a single channel correlator and produces in-phase and quadrature measurements of the strongest GPS data signal received from the non-coherent GPS correlator 726. At this point, a strongest GPS signal has been chosen and is used from this point on in order to increase the reliability and likelihood of obtaining a time determination. It is important to note that the non-coherent correlator 726 and the coherent correlator 729 can be the same correlator, used in two different modes.

Like the non-coherent GPS correlator 726, the coherent GPS correlator 729 may be implemented by dedicated hardware or may be created by software coded into a programmable digital signal processor.

Connected to the coherent GPS correlator 729 is the post-correlation memory storage switch 732 that connects to the sample memory 735 and creates in-phase and quadrature measurement sample words that are stored in the sample memory 735. The memory storage switch 732 in the preferred embodiment takes one millisecond samples and creates N words of complex data of the in-phase and quadrature measurements, corresponding to the N milliseconds of data stored in the digital IF memory 721. The 1 millisecond samples have been de-spread (the GPS signal is a spread spectrum signal), are approximately at zero Doppler, and thus the only remaining signal on the sample words is the 50 BPS data pattern (and noise).

Connected to the samples memory 735 is the clean-up mixer 738 which removes any remaining Doppler characteristic from the stored in-phase and quadrature measurements (the samples memory 735 contains in-phase and quadrature measurement that have all or almost all Doppler removed from the samples). This can be accomplished using multiple techniques in an iterative manner, since the post correlation samples are already stored in memory and can be re-played. One method, for example, involves iteratively stepping the remaining Doppler wipe-off frequency over multiple correlations off the complete sample set stored in the samples memory 735 so as to find the Doppler wipe-off frequency that maximizes the peak signal in the magnitude versus delay memory 762. In order to best do this, the estimated Doppler frequency used to wipe-off most of the Doppler signal in the coherent correlator 729 should be held constant while the samples memory 735 is filled. In this way, a constant remaining Doppler wipe-off frequency can be used, or for the case of a receiver undergoing dynamics, a chirped (non constant, changed at a constant rate of frequency change) remaining Doppler wipe-off frequency can also be tried as part of the iterative trials.

The correlator 742 is connected to the clean-up mixer 738 and to the expected data pattern 744. The correlator 742 correlates the in-phase and quadrature measurements against the expected data pattern 744.

Figure 8:
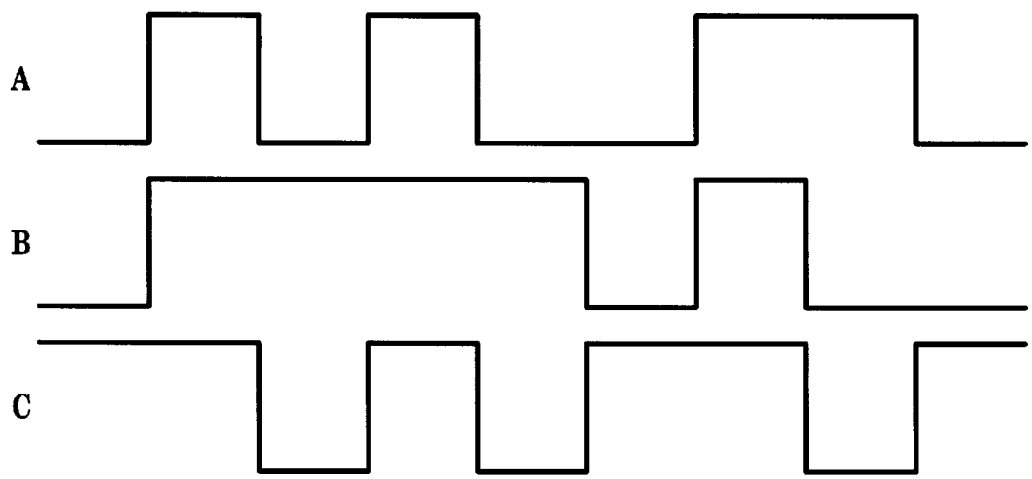
FIG. 8 shows how signals A and B are correlated to produce an output signal C.

In the preferred embodiment the expected data pattern 744 is the preamble 102, the HOW word 105, and/or the subframe ID 106 of the GPS data message 100. The expected data pattern 744 is connected to a time expander 748 which expands each bit from 1 millisecond to 20 milliseconds in duration, and the time expander 748 is further connected to a delay 750. The delay 750 is connected to the correlator 742. Therefore, the predicted 50 BPS data pattern is converted to a data pattern 200 milliseconds in length (for the case of preamble 102) in order to match the length of the sample words stored in the samples memory 735. The correlator 742 coherently correlates the received and stored data against this expected data pattern and produces higher values when the data patterns correlate. This is shown in FIG. 8, where signals A and B are correlated to produce an output signal C. Signal C therefore contains a digital one when signals A and B have the same value, and contains a digital zero when signals A and B differ. This can be accomplished by exclusive OR gates in hardware or by a microprocessor algorithm stored in its memory.

The coherent integrator 754 is connected to the correlator 742 and integrates the correlation output to produce an integration output. It should be noted that much of the work to accomplish the N–M delayed coherent integrations can be done with a recursive algorithm stored in a microprocessor or in dedicated hardware, thus greatly reducing the number of operations necessary. In addition, the multiplication operations are all by +1 or −1, greatly simplifying the arithmetic.

The magnitude determiner 757 is connected to the coherent integrator 754 and detects a magnitude of the integration result. A plurality of integration magnitudes from the magnitude determiner 757 are stored into the magnitude versus delay memory 762. In the preferred embodiment, a total of N–M magnitude values are produced and stored in the magnitude versus delay memory 762. The parameter N is the size in words of the samples memory 735, with N reflecting the number of milliseconds of data captured in the digital IF memory 721. For the case that the digital IF memory contains 1 second of data (i.e., 1000 samples), the parameter N is 1,000. The parameter M is the length of the known data pattern. If the preamble 102 is to be captured, parameter M is 200 milliseconds long. Likewise, for the HOW word 105 the parameter M is 340 milliseconds long. The number of integration magnitudes corresponds to the number of samples in the original IF data captured after the ADC 711.

Figure 9:
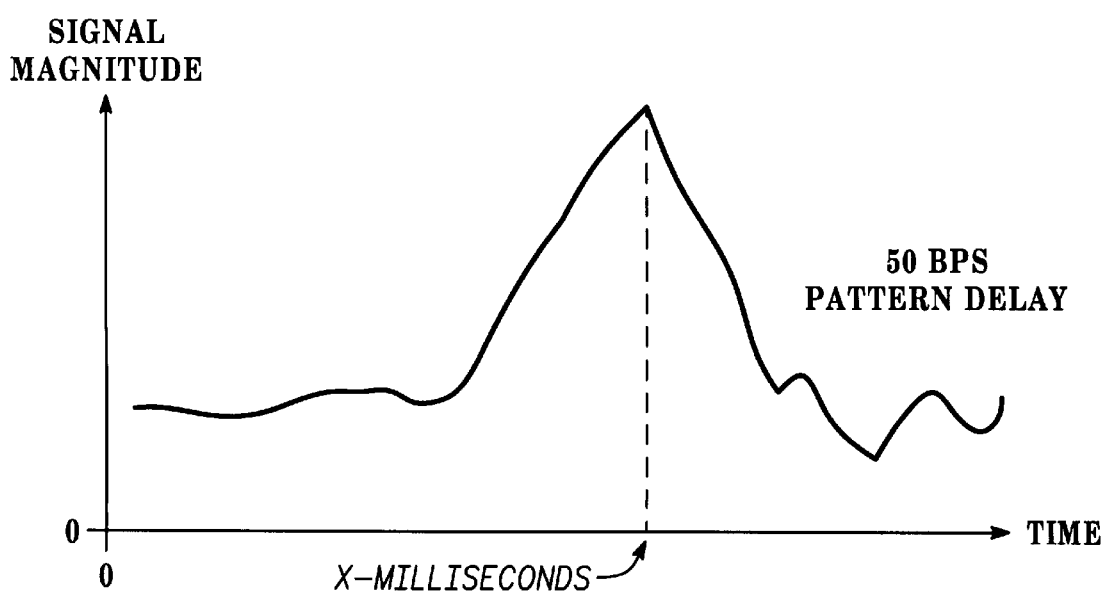
FIG. 9 shows how the maximum integrated magnitude indicates the start of the predicted data pattern.

The maximum integration magnitude determiner 766 then uses the data stored in the magnitude versus delay memory 762 to determine the point at which a maximum integration result is achieved. This is shown in FIG. 9, wherein the maximum integrated magnitude indicates the start of the predicted data pattern. The time offset between the time of a start of signal capture (the time zero point) and the time of the measured maximum integrated magnitude (the peak) is the time offset being sought. The time offset may then be used (along with the code phase and the location of the selected satellite, and its corresponding satellite clock correction) to determine actual (local) time and to recalibrate the handset real-time clock, as discussed above in conjunction with step 538 of FIG. 5 and step 638 of FIG. 6.

Figure 10:
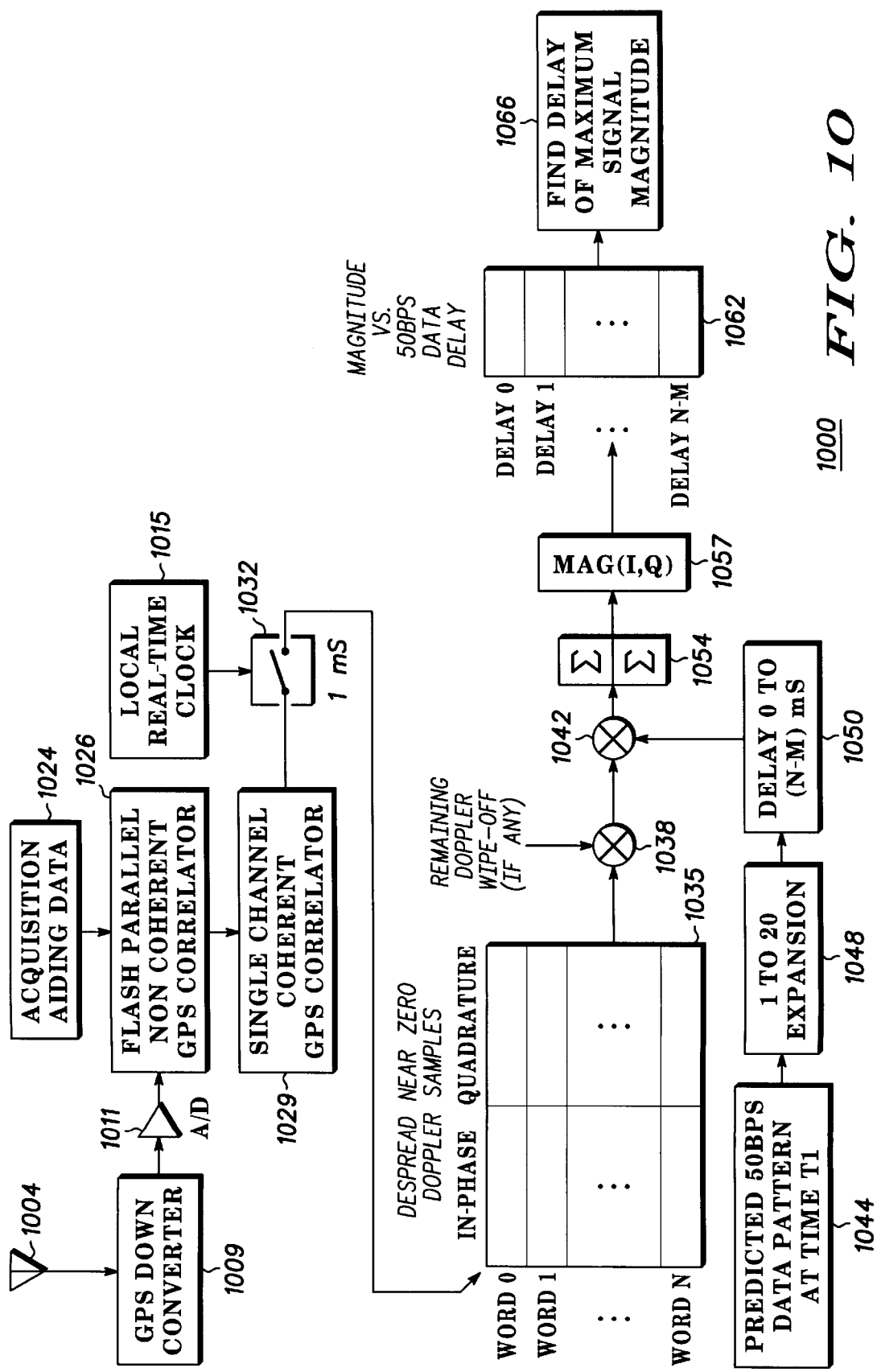
FIG. 10 shows a block diagram of a second embodiment of the apparatus, without the use of a signal IF capture memory.

In a similar manner, a second embodiment of an apparatus for determining time on a GPS handset as shown in FIG. 10 is used for which the digital IF samples memory 721 and IF switch 713 as shown in FIG. 7 have been eliminated. Referring to FIG. 10, the local real time clock 1015 directly controls the capture time switch 1032 of the post-correlation in-phase and quadrature samples stored in the samples memory 1035. The remaining apparatus is the same as described with reference to FIG. 7. The apparatus 1000 is therefore designed to process GPS signals on-the-fly in order to determine the time offset.

It should be noted that elements 732 through 766 and elements 1032 through 1066 can preferably all be accomplished in a software algorithm running on a controlling microprocessor and thus requiring no additional hardware.

While the preferred embodiments have been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A method for determining time in a global positioning satellite (GPS) receiver, comprising:
    capturing GPS data from a GPS message for a predetermined period of time;
    locating a time of arrival of an expected data pattern in said captured GPS data by correlating the captured GPS data with the expected data pattern; and
    determining a time offset between a start time of said predetermined period of time and a time of arrival of said expected data pattern.

2. The method of claim 1, wherein said time offset is used to calibrate a clock of said GPS receiver.

3. The method of claim 1, wherein said GPS message is from a GPS satellite and wherein the step of determining further comprises the step of:
    correcting said time offset to compensate for a signal propagation time between said GPS satellite and said GPS receiver.

4. The method of claim 3, wherein the step of correcting further comprises the step of:
    modifying said corrected time offset to compensate for a satellite clock offset time.

5. The method of claim 1, wherein said expected data pattern is a GPS message preamble.

6. The method of claim 1, wherein said expected data pattern is a hand-over word.

7. The method of claim 1, wherein said expected data pattern is a subframe ID.

8. The method of claim 1, wherein said expected data pattern is selected from the group consisting of a GPS message preamble, a hand-over word, and subframe ID, and combinations thereof.

9. The method of claim 1, wherein said predetermined period of time is approximately one second.

10. The method of claim 1, wherein the step of capturing comprises the steps of:
    down converting a GPS signal to a predetermined intermediate frequency;
    sampling said down-converted GPS signal to produce a plurality of samples; and
    storing said plurality of samples into a memory.

11. A method for determining time in a global positioning satellite (GPS) receiver, comprising:
    capturing post correlation coherent GPS data for a predetermined period of time;
    locating a time of arrival of a predetermined data sequence in said captured post correlation coherent GPS data by correlating the captured post correlation GPS data with the predetermined data sequence; and
    determining a time offset between a start time of said predetermined period of time and a time of arrival of said predetermined data sequence.

12. The method of claim 11, wherein said time offset is used to calibrate a clock of said GPS receiver.

13. The method of claim 11, wherein said captured post correlation coherent GPS data is from a GPS satellite and wherein the step of determining further comprises the step of:
    correcting said time offset to compensate for a signal propagation time between a said GPS satellite and said GPS receiver.

14. The method of claim 13, wherein the step of correcting further comprises the step of:
    modifying said corrected time offset to compensate for a satellite clock offset time.

15. The method of claim 11, wherein said predetermined data sequence is a GPS message preamble.

16. The method of claim 11, wherein said p redetermined data sequence is a hand-over word.

17. The method of claim 11, wherein said predetermined data sequence is a subframe ID.

18. The method of claim 11, wherein said predetermined data sequence is selected from the group consisting of a GPS message preamble, a hand-over word, and subframe ID, and combinations thereof.

19. The method of claim 11, wherein said predetermined period of time is about one second.

20. The method of claim 11, wherein said step of capturing comprises the steps of:
down converting a GPS signal to a predetermined intermediate frequency;
sampling said down-converted GPS signal to produce a plurality of samples;
coherently correlating said plurality of samples against a predetermined satellite pseudo random noise code; and
storing post correlation coherent in phase and quadrature GPS signal characteristics as post correlation coherent GPS data.

21. A method for determining time in a GPS receiver, comprising the steps of:
down converting a GPS signal to a predetermined intermediate frequency;
sampling said down-converted GPS signal to produce a plurality of samples;
storing said plurality of samples in a memory;
selecting a GPS signal from a visible GPS satellite;
measuring and storing in-phase and quadrature coherent characteristics of said selected GPS signal over a plurality of predetermined time periods;
coherently correlating said in-phase and quadrature coherent characteristics to an expected data pattern; and
determining a time offset from a correlation maximum, with said correlation maximum occurring said time offset after a beginning time of said step of storing.

22. The method of claim 21, wherein the step of selecting comprises:
determining a code phase for each visible GPS satellite signal in the memory;
determining a Doppler shift for said each visible GPS satellite signal in the memory; and
choosing a GPS signal having a strongest signal level dependent on the determined code phase for said each visible GPS satellite signal and the determined Doppler shift for said each visible GPS satellite signal.

23. The method of claim 21, wherein said method determines a capture time from said time offset, a code phase for said selected GPS signal, and a location of a GPS satellite corresponding to said selected GPS signal.

24. The method of claim 21, wherein said step of determining further comprises:
correcting said time offset for a signal propagation time between said GPS receiver and a GPS satellite corresponding to said selected GPS signal.

25. The method of claim 24, wherein said step of correcting further comprises:
modifying said corrected time offset to compensate for a satellite clock offset time.

26. The method of claim 21, wherein said expected data pattern is a GPS message preamble.

27. The method of claim 21, wherein said expected data pattern is a hand-over word.

28. The method of claim 21, wherein said expected data pattern is selected from the group consisting of a GPS message preamble, a hand-over word, and subframe ID, and combinations thereof.

29. The method of claim 21, wherein said step of storing captures about one second of said GPS signal.

30. A method for determining time in a GPS receiver, comprising the steps of:
down converting a GPS signal to a predetermined intermediate frequency;
sampling said down-converted GPS signal to produce a plurality of samples;
non-coherently correlating said plurality of samples against each visible GPS satellite pseudo random noise code and each visible GPS satellite Doppler;
selecting a GPS satellite signal;
measuring and storing an in-phase and quadrature coherent characteristics of said selected GPS satellite signal over a plurality of predetermined time periods;
coherently correlating said in-phase and quadrature coherent characteristics to an expected data pattern; and
determining a time offset from a correlation maximum, with said correlation maximum occurring said time offset after a beginning time of said step of measuring and storing.

31. The method of claim 30, wherein the step of selecting comprises:
determining a real-time code phase for said each visible GPS satellite from said each visible GPS satellite pseudo random noise code;
determining a real-time Doppler shift for said each visible GPS satellite from said each visible GPS satellite Doppler; and
choosing a GPS satellite signal having a strongest signal level dependent on the determined real-time code phase for said each visible GPS satellite and the determined real-time Doppler shift for said each visible GPS satellite.

32. The method of claim 30, wherein said method determines a capture time from said time offset, said code phase for said selected GPS satellite signal, and a location of a GPS satellite corresponding to said selected GPS satellite signal.

33. The method of claim 30, wherein said step of determining further comprises:
correcting said time offset to compensate for a signal propagation time between said GPS receiver and a GPS satellite corresponding to said selected GPS satellite signal.

34. The method of claim 33, wherein the step of correcting further comprises:
modifying said corrected time offset to compensate for a satellite clock offset time.

35. The method of claim 30, wherein said expected data pattern is a GPS message preamble.

36. The method of claim 30, wherein said expected data pattern is a hand-over word.

37. The method of claim 30, wherein said expected data pattern is selected from the group consisting of a GPS message preamble, a hand-over word, and subframe ID, and combinations thereof.

38. The method of claim 30, wherein said step of measuring and storing captures about one second of said selected GPS satellite signal.

39. The method of claim 30, wherein said step of measuring and storing captures post correlation data at a rate of one sample per millisecond.

40. An apparatus for determining time in a GPS receiver, comprising:

a down converter for down converting a plurality of GPS signals to an intermediate frequency;

an analog-to-digital converter coupled to said down converter for converting said down-converted plurality of GPS signals to digital data;

a digital intermediate frequency (IF) switch coupled to said analog-to-digital converter and coupled to a clock, said digital IF switch controlled by said clock to periodically close for a predetermined sample time period;

an IF memory coupled to said digital IF switch for storing a plurality of digital IF data available when said digital IF switch is closed;

a non-coherent GPS correlator coupled to said IF memory for determining a code phase characteristic, determining a Doppler characteristic, determining a signal strength characteristic for a plurality of GPS signals in said plurality of digital IF data, and selecting a GPS satellite signal based on said determined code phase characteristics, determined Doppler characteristics, and determined signal strength characteristics;

a coherent GPS correlator coupled to said IF memory and said non-coherent GPS correlator for producing in-phase and quadrature coherent measurements;

a memory storage switch coupled to said coherent GPS correlator, said memory storage switch periodically closing to produce a plurality of in-phase and quadrature coherent measurement samples;

a samples memory coupled to said memory storage switch for storing said plurality of in-phase and quadrature coherent measurement samples;

a correlator coupled to said samples memory and to a predetermined expected data pattern storage, said correlator coherently correlating said plurality of in-phase and quadrature coherent measurement samples to a predetermined expected data pattern in said predetermined expected data pattern storage to produce a correlation output;

a coherent integrator coupled to said correlator for integrating said correlation output to produce an integration output;

a magnitude determiner coupled to said coherent integrator for detecting a magnitude of said integration output and generating a plurality of integration magnitudes;

a magnitude versus delay memory coupled to said magnitude determiner and storing said plurality of integration magnitudes; and a maximum integration magnitude determiner coupled to said magnitude versus delay memory and capable of determining a maximum integration magnitude and a time offset representative of a delay period from a starting time of storing a plurality of digital IF data to said maximum integration magnitude.

41. The apparatus of claim 40, wherein a capture time is determined from said time offset, a code phase of said selected GPS satellite signal, a location of a satellite corresponding to said selected GPS satellite signal, and a location of said apparatus.

42. The apparatus of claim 40, wherein said time offset is corrected for a signal propagation time between a satellite corresponding to said selected GPS satellite signal and said GPS receiver and is further corrected for a satellite clock offset time.

43. The apparatus of claim 40, wherein said clock is a real-time clock periodically recalibrated by said apparatus.

44. The apparatus of claim 40, wherein said predetermined sample time period is about one second.

45. The apparatus of claim 40, wherein said IF memory is capable of storing about digital IF data representing about one elapsed second.

46. The apparatus of claim 40, wherein said non-coherent GPS correlator also receives satellite acquisition assist data.

47. The apparatus of claim 40, wherein said non-coherent GPS correlator is a dedicated hardware device.

48. The apparatus of claim 40, wherein said non-coherent GPS correlator is a programmed digital signal processor.

49. The apparatus of claim 40, wherein said coherent GPS correlator is a dedicated hardware device.

50. The apparatus of claim 40, wherein said coherent GPS correlator is a single channel coherent GPS correlator.

51. The apparatus of claim 40, wherein said coherent GPS correlator is a programmed digital signal processor.

52. The apparatus of claim 40, wherein said predetermined expected data pattern is expanded in duration.

53. The apparatus of claim 40, further including a cleanup mixer coupled between said samples memory and said correlator for removing at least a portion of any remaining Doppler characteristic from said plurality of in-phase and quadrature coherent measurement samples.

54. An apparatus for determining time in a GPS receiver, comprising:

a down converter for down converting a GPS signal to an intermediate frequency;

an analog-to-digital converter coupled to said down converter for converting said down-converted GPS signal to digital data;

a non-coherent GPS correlator coupled to said analog-to-digital converter for determining a code phase characteristic, determining a Doppler characteristic, determining a signal strength characteristic for said digital data, and selecting a GPS satellite signal based on said determined code phase characteristics, determined Doppler characteristics, and determined signal strength characteristics;

a coherent GPS correlator coupled to said analog-to-digital converter and said non-coherent GPS correlator for producing in-phase and quadrature coherent measurements;

a memory storage switch coupled to said coherent GPS correlator and coupled to a clock, said memory storage switch controlled by said clock to periodically close to produce a plurality of in-phase and quadrature coherent measurement samples;

a samples memory coupled to said memory storage switch for storing said plurality of in-phase and quadrature coherent measurement samples;

a correlator coupled to said samples memory and to a predetermined expected data pattern storage for coherently correlating said plurality of in-phase and quadrature coherent measurement samples to a predetermined expected data pattern in said predetermined expected data pattern storage to produce a correlation output;

a coherent integrator coupled to said correlator for integrating said correlation output to produce an integration output;

a magnitude determiner coupled to said coherent integrator for detecting a magnitude of said integration output and generating a plurality of integration magnitudes;

a magnitude versus delay memory coupled to said magnitude determiner for storing said plurality of integration magnitudes; and a maximum integration magnitude determiner coupled to said magnitude versus delay memory for determining a maximum integration magnitude and a time offset representing a delay period from a start time of storing said plurality of in-phase and quadrature measurement samples and said maximum integration magnitude.

55. The apparatus of claim 54, wherein a capture time is determined from said time offset, a code phase of a satellite corresponding to said selected GPS satellite signal, a location of said satellite corresponding to said selected GPS satellite signal, and a location of said apparatus.

56. The apparatus of claim 54, wherein said time offset is corrected for a signal propagation time between a satellite corresponding to said selected GPS satellite signal and said GPS receiver.

57. The apparatus of claim 56, wherein said time offset is further corrected to compensate for a satellite clock offset time.

58. The apparatus of claim 54, wherein said clock is a local real-time clock periodically recalibrated by said apparatus.

59. The apparatus of claim 54, wherein said samples memory is capable of storing in-phase and quadrature coherent measurement samples representing about one elapsed second.

60. The apparatus of claim 54, wherein said non-coherent GPS correlator also receives satellite acquisition assist data.

61. The apparatus of claim 54, wherein said non-coherent GPS correlator is a dedicated hardware device.

62. The apparatus of claim 54, wherein said non-coherent GPS correlator is a programmed digital signal processor.

63. The apparatus of claim 54, wherein said coherent GPS correlator is a dedicated hardware device.

64. The apparatus of claim 54, wherein said coherent GPS correlator is a single channel coherent GPS correlator.

65. The apparatus of claim 54, wherein said coherent GPS correlator is a programmed digital signal processor.

66. The apparatus of claim 54, wherein said predetermined expected data pattern is expanded to a total length representing about 200 milliseconds.

67. The apparatus of claim 54, wherein said apparatus captures post correlation results data at a rate of one sample per millisecond.

68. The apparatus of claim 54, further including a cleanup mixer coupled between said samples memory and said correlator for removing at least a portion of any remaining Doppler characteristic from said plurality of in-phase and quadrature coherent measurement samples.

* * * * *